United States Patent
Santa et al.

(10) Patent No.: US 10,221,348 B2
(45) Date of Patent: Mar. 5, 2019

(54) METHOD OF RECOVERING OIL FROM A SUBTERRANEAN FORMATION

(71) Applicant: BASF SE, Ludwigshafen (DE)

(72) Inventors: Monika Santa, Bremen (DE); Ansgar Behler, Bottrop (DE); Thomas Van Der Koelen, Oberhausen (DE)

(73) Assignee: BASF SE, Ludwigshafen am Rhein (DE)

( * ) Notice: Subject to any disclaimer, the term of this patent is extended or adjusted under 35 U.S.C. 154(b) by 1279 days.

(21) Appl. No.: 13/914,061

(22) Filed: Jun. 10, 2013

(65) Prior Publication Data

US 2013/0327523 A1 Dec. 12, 2013

Related U.S. Application Data

(60) Provisional application No. 61/657,986, filed on Jun. 11, 2012.

(51) Int. Cl.
*C09K 8/58* (2006.01)
*E21B 43/16* (2006.01)
*C09K 8/584* (2006.01)

(52) U.S. Cl.
CPC .............. *C09K 8/58* (2013.01); *C09K 8/584* (2013.01); *E21B 43/16* (2013.01)

(58) Field of Classification Search
CPC ....................................................... C09K 8/34
See application file for complete search history.

(56) References Cited

U.S. PATENT DOCUMENTS

| | | |
|---|---|---|
| 3,811,504 A | 5/1974 | Flournoy et al. |
| 3,811,505 A | 5/1974 | Flournoy et al. |
| 3,811,507 A | 5/1974 | Flournoy et al. |
| 3,927,716 A | 12/1975 | Burdyn et al. |
| 4,834,903 A | 5/1989 | Roth et al. |
| 4,985,154 A | 1/1991 | Balzer et al. |
| 5,627,144 A | 5/1997 | Urfer et al. |
| 6,248,792 B1 | 6/2001 | Lazarowitz |
| 2004/0136939 A1 | 7/2004 | Schmid et al. |
| 2004/0147424 A1* | 7/2004 | Syldath et al. ............... 510/421 |
| 2006/0046948 A1 | 3/2006 | Tang et al. |
| 2007/0160652 A1* | 7/2007 | Mueller et al. ............... 424/443 |
| 2007/0161536 A1 | 7/2007 | Behler et al. |
| 2007/0219097 A1 | 9/2007 | Mueller et al. |
| 2009/0264598 A1 | 10/2009 | Bittner et al. |
| 2010/0213409 A1 | 8/2010 | Bittner et al. |
| 2012/0241151 A1 | 9/2012 | Bittner et al. |

FOREIGN PATENT DOCUMENTS

| | | |
|---|---|---|
| CA | 2053900 A1 | 10/1990 |
| JP | 58/217598 A * | 12/1983 |
| WO | WO-90/13533 A1 | 11/1990 |
| WO | WO-97/42299 A1 | 11/1997 |
| WO | WO-200072952 A1 | 12/2000 |
| WO | WO-2002090369 A2 | 11/2002 |
| WO | WO-2005087785 A2 | 9/2005 |
| WO | WO-2009/124922 A1 | 10/2009 |
| WO | WO-2011/038745 A1 | 4/2011 |

OTHER PUBLICATIONS

Foster, "A Low-Tension Waterflooding Process", *SPE-AIME, Mobile Research and Development Corp.*, pp. 205-210 (1973).
Iglauer et al., "Alkyl Polyglycoside surfactant—Alcohol Cosolvent Formulations for Improved Oil Recovery", *Colloids and Surfaces A: Physlocochem, Eng. Aspects*, vol. 339, pp. 48-59 (2009).
European Search Report for EP 12 17 1428 dated Oct. 8, 2012.
"Plantapon LGC Sorb Next Generation AP", XP-002709994, Cognis Care Chemicals, (2004), pp. 1-8.

* cited by examiner

*Primary Examiner* — Angela M DiTrani Leff
*Assistant Examiner* — Avi T Skaist
(74) *Attorney, Agent, or Firm* — Drinker Biddle & Reath LLP

(57) ABSTRACT

Method of recovering oil from a subterranean formation which comprises a step of injecting an aqueous composition comprising alkyl and/or alk(en)yl oligolucoside (ether) carboxylates into the subterranean formation and method of alkali-surfactant flooding and alkali-surfactant-polymer-flooding using such alkyl and/or alk(en)yl oligolucoside (ether) carboxylates.

21 Claims, No Drawings

US 10,221,348 B2

METHOD OF RECOVERING OIL FROM A SUBTERRANEAN FORMATION

CROSS-REFERENCE TO RELATED APPLICATIONS

This application claims benefit under 35 U.S.C. § 119(e) of U.S. Provisional Patent App. Ser. No. 61/657,986, filed Jun. 11, 2012, which is incorporated herein by reference in its entirety.

The present invention relates to a method of recovering oil from a subterranean formation which comprises a step of injecting an aqueous composition comprising alkyl and/or alk(en)yl oligolucoside (ether) carboxylates into the subterranean formation. In particular, the invention relates to a method of alkali-surfactant flooding and alkali-surfactant-polymer-flooding using such alkyl and/or alk(en)yl oligolucoside (ether) carboxylates.

In the recovery of oil from oil-bearing reservoirs, it usually is possible to recover only minor portions of the original oil in place by the so-called primary recovery methods which utilise only the natural forces present in the reservoir.

A variety of supplemental recovery techniques have been employed in order to increase the recovery of oil from subterranean reservoirs. The most widely used supplemental recovery technique is water flooding which involves the injection of water into the reservoir. As the water moves through the reservoir, it acts to displace oil therein to a production system composed of one or more wells through which the oil is recovered. Such water injection techniques are also known as secondary oil recovery.

It has been proposed to add surfactants to the flood water in order to lower the oil-water interfacial tension and/or to alter the wettability characteristics of the reservoir rock. Processes of oil recovery which involve the injection of aqueous surfactant solutions are commonly referred to as surfactant flooding. Also, it has been proposed to add rheology modifiers such as polymeric thickening agents to all or part of the injected water in order to increase the viscosity thereof, thus decreasing the mobility ratio between the injected water and oil and improving the sweep efficiency of the water flood. Such techniques of adding surfactants, thickening polymers and/or further chemicals to injection water are also known as tertiary oil production or enhanced oil recovery (EOR).

The requirements on surfactants for EOR differ significantly from requirements on surfactants for other applications: suitable surfactants for EOR should reduce the interfacial tension between water and oil (typically approx. 20 mN/m) to particularly low values of less than $10^{-2}$ mN/m in order to enable sufficient mobilization of the mineral oil. This has to be done at the customary deposit temperatures of approx. 15° C. to 130° C. and in the presence of water of high salt content, more particularly also in the presence of high proportions of calcium and/or magnesium ions; the surfactants thus also have to be soluble in deposit water with a high salt content.

Many water flooding applications have employed anionic surfactants. For example, an early paper by W. R. Foster entitled "*A Low-Tension Water Flooding Process*", Journal of Petroleum Technology, Vol. 25, February 1973, pp. 205-210, describes a technique involving the injection of an aqueous solution of petroleum sulfonates within designated equivalent weight ranges and under controlled conditions of salinity. The petroleum sulfonate slug is followed by a thickened water slug which contains a thickening agent such as a water-soluble biopolymer. This thickened water slug is then followed by a driving fluid such as field brine which is injected as necessary to carry the process to conclusion.

One problem encountered in water flooding with certain of the anionic surfactants such as the petroleum sulfonates is the lack of stability of these surfactants in so-called "hard water" environments. These surfactants tend to precipitate from solution in the presence of relatively low concentrations of divalent metal ions such as calcium and magnesium ions. For example, divalent metal ion concentrations of about 50-100 ppm and above may cause precipitation of petroleum sulfonates.

Non-ionic surfactants, such as polyethoxylated alkyl phenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. However, non-ionic surfactants are not as effective on a per mole basis as are the more commonly used anionic surfactants and, additionally, the non-ionic surfactants generally have a higher cost per unit weight than do the anionic surfactants. Therefore, it has been suggested to use certain combinations of anionic and non-ionic surfactants to deal with the conditions prevailing in hard water environments. For example, U.S. Pat. No. 3,811,505 (Texaco) discloses the use of alkyl or alkylaryl sulfonates or phosphates and polyethoxylated alkyl phenols. U.S. Pat. No. 3,811,504 (Texaco) discloses the use of a three component mixture including an alkyl or alkylaryl sulfonate, an alkyl polyethoxysulphate and a polyethoxylated alkyl phenol. U.S. Pat. No. 3,811,507 (Texaco) discloses the use of a water-soluble salt of a linear alkyl or alkylaryl sulfonate and a polyethoxylated alkyl sulphate.

It is also known in the art to use alkyl polyglucosides as non-ionic surfactants for enhanced oil recovery such as for instance disclosed in WO 2011/038745 A1, WO 2009/124922 A1 or U.S. Pat. No. 5,627,144.

It is however a disadvantage of using alkyl polyglucosides that sufficiently low interfacial tensions are difficult to obtain, and therefore usually significant amounts of cosolvents, for example alcohols are used in combination with alkyl polyglucosides.

U.S. Pat. No. 4,985,154 describes a mixture of alkyl polyglucosides with cosolvents for use in oil production. The cosolvents mentioned include various alcohols, for example monoalcohols having 3 to 8 carbon atoms, polyalcohols having 3 to 10 carbon atoms, alkyl ethers of polyalcohols having 2 to 8 carbon atoms in the alkyl chain, or alkyl polyglucosides with alkyl chains of 3 to 6 carbon atoms in length.

US 2006/046948 claims the mixture of alkyl polyglucosides with aromatic alcohols for tertiary mineral oil production. The mixing ratio of the aromatic alcohol with the alkyl polyglucosides may be 1000:1 to 1:1000. In addition, it discloses combinations of the aliphatic alcohols 1-propanol, 1-butanol, 1-hexanol or 1-octanol with a C12-based alkyl polyglucoside in a weight ratio of 1:3, which attains the required interfacial tensions with octane as a model oil. A low interfacial tension without addition of alcohol was not found.

S. Iglauer, Y. Wu, P. Shuler, Y. Tang and W. A. Goddard III, *Colloids and Surfaces A: Physichochem. Eng. Aspects* 339 (2009) 48-59 disclose formulations composed of alkyl polyglucosides and various alcohol cosolvents for improved mineral oil production. The cosolvents used were, for example, 1-propanol, 1-butanol, 1-hexanol, 1-octanol, 1-dodecanol, 4-methyl-2-hexanol, cyclohexanol or phenol or naphthol.

Besides alkyl polyglucosides also carboxalyted derivatives of alkyl polyglucosides are known in the art. The manufacture of such carboxylated derivatives and their use for detergents or foam generation has been disclosed for instance in WO 97/42299 A1, WO 2000/72952 A1, or WO 2002/090369 A2.

US 2007/0219097 A1 discloses drilling fluids which comprise a surfactant mixture produced by reacting an aqueous solution of alkyl and/or alkenyl oligoglcosides with ω-halocarboxylic acids or salts or esters thereof. Drilling fluids serve various functions in course of drilling, including the removal of borehole cuttings from the borehole, however it is not the aim of drilling fluids to penetrate into the subterranean formation but they should remain in the borehole. The use of the alkyl and/or alkenyl oligoglcosides derivatives mentioned above for enhanced oil recovery has not been disclosed in US 2007/0219097 A1.

There are widely distributed techniques of enhanced oil recovery which involve the use of alkaline aqueous solutions. Crude oil may comprise also carboxylic acids such as naphthenic acid. Alkali converts such acids into the respective salts and the resulting carboxylic acid salts serve as naturally occurring surfactants which aid mobilizing crude oil from the formation. It is in particular known to use aqueous solutions comprising alkaline components in combinations with surfactants for EOR and it is known to use aqueous solutions comprising alkaline components, surfactants and thickening polymers. The first technique is known as alkali surfactant flooding and the latter as alkali surfactant polymer flooding. The possible generation of precipitates in alkaline environment is an even more crucial problem than in acidic environment and therefore, there is a need for surfactants which show a good performance in alkali-surfactant flooding and/or alkali-surfactant-polymer flooding.

Accordingly, a method of recovering oil from a subterranean formation has been found which comprises the step of injecting into said formation an aqueous composition that contains a surface-active amount of an alkyl or alkenyl oligoglycoside (ether) carboxylate according to formula (I)

$$R^1-O-[(G)_p(AO)_n](-R^2-COOX)_q \qquad (I)$$

wherein
R$^1$ is a linear or branched, alkyl and/or alkenyl group having from 8 to 22 carbon atoms;
R$^2$ is a linking group selected from the group of
 R$^{2a}$: hydrocarbon groups comprising 1 to 6 carbon atoms,
 R$^{2b}$: ester groups —C(O)—O—R$^3$—, wherein R$^3$ is a hydrocarbon group comprising 1 to 6 carbon atoms;
X is hydrogen or an alkaline cation;
AO is one or more groups selected from the group of ethylene oxide, propylene oxide and/or butylene oxide groups;
G is a sugar unit having 5 or 6 carbon atoms;
n is a number from 0 to 50;
p is a number from 1 to 10; and
q is a number from 1 to 4.

Surprisingly it has been observed that alkyl and/or alkenyl oligoglucoside derivatives of formula (I) show a superior behavior compared to alkyl polyglycosides in particular in alkali-surfactant flooding.

With regard to the invention, the following should be stated explicitly:

In the method for enhanced oil recovery as described above, an aqueous surfactant composition comprising at least one surfactant of formula (I) is used. Besides the surfactants of formula (I) also other chemical components, including but not limited to other surfactants may be used.

Alkyl- and/or Alkenyl Oligoglycoside Derivatives Used as Surfactants

The alkyl- and/or alkenyl oligoglycoside derivatives used for the method of recovering oil according to the present invention are carboxylate derivatives of alkyl- and/or alkenyl oligoglycosides or carboxylate derivatives of alkoxylated alkyl- and/or alkenyl oligoglycosides.

Such compounds are known in the art and may be obtained by reacting alkyl- and/or alkenyl oligoglycosides with suitable reagents for introducing carboxylate groups or by alkoxylating alkyl- and/or alkenyl oligoglycosides in a first step and then reacting alkoxylated alkyl- and/or alkenyl oligoglycosides with suitable reagents for introducing carboxylate groups.

Alkyl- and/or Alkenyl Oligoglycoside Group

The alk(enyl) oligoglycoside part of the molecule may be represented by the formula R$^1$—O(G)$_p$ (II), wherein R$^1$, G, and p have the meaning as mentioned above. They can be derived from aldoses or ketoses containing 5 or 6 carbon atoms, preferably glucose. Accordingly, the preferred alkyl and/or alkenyl oligoglycosides starting materials are alkyl or alkenyl oligoglucosides. These materials are also known generically as "alkyl polyglycosides" (APG).

Index p in general formulas (I) and (II) indicates the degree of oligomerisation (DP degree), i.e. the number of mono- and oligoglycosides units, and is a number of 1 to 10. Whereas p for a specific molecule necessarily must always be an integer the value p for of an alkyl oligoglycoside is an analytically determined calculated quantity which not necessarily needs to be an integer but may be a rationale number. Alk(en)yl oligoglycosides having an average degree of oligomerisation p of 1.1 to 3.0 are preferably used. Alk(en)yl oligoglycosides having a degree of oligomerisation below 1.7 and, more particularly, between 1.2 and 1.4 are preferred from the applicational point of view.

The alkyl or alkenyl radical R$^1$ may be derived from primary aliphatic saturated and/or unsaturated alcohols containing from 4 to 22, in particular 8 to 22 and preferably from 8 to 18 carbon atoms, more preferably from 10 to 16 carbon atoms. Typical examples are butanol, caproic alcohol, caprylic alcohol, capric alcohol, undecyl alcohol, lauryl alcohol, myristyl alcohol, cetyl alcohol, palmitoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol and technical mixtures thereof such as are formed, for example, in the hydrogenation of technical fatty acid methyl esters or in the hydrogenation of aldehydes from Roelen's oxo synthesis. Alkyl oligoglucosides based on hydrogenated C$_8$-C$_{16}$ coconut oil alcohol having a DP of 1 to 3 are preferred.

Alkyl- and/or Alkenyl Oligoglycosides Comprising Poly Alkoxy Groups

In one embodiment of the invention alkoxylated alkyl- and/or alkenyl oligoglycosides are used as starting material for making the carboxylate derivatives. Such alkoxylated products may be represented by the formula R$^1$—O—[(G)$_p$(AO)$_n$] (III) and are generically obtainable by adding alkylene oxide, more particularly ethylene oxide (EO), propylene oxide (PO), butylene oxide (BO) or their mixtures—either in random distribution or block wise—to the glycoside unit. In formula (III), p has the meaning as defined above and n is the number of alkylene oxide units. Basically, it is possible to obtain these intermediates by alkoxylation of the sugar body and subsequent acetalisation with an alcohol to end up with the alkoxylated alkyl oligoglycoside However, it has been found more advantageous with regard to product quality and yields to start from the alkyl oligoglycoside and add the alkylene oxides. In order to avoid ambiguities it should be noted, that alkoxylation takes place at the free hydroxyl groups of the sugar body. Since the reaction is thermodynamically controlled one will obtain a statistical distribution of the alkylene oxide units over the hydroxyl groups that are available for alkoxylation. The alkoxylation of alkyl- and/or alkenyl oligoglycosides is known to the skilled artisan and suitable procedures are disclosed for example in U.S. Pat. No. 4,834,903 or WO 2005/087785 A2. The reaction may be conducted under usual conditions, preferably in the presence of an alkaline catalyst, which can be a homogeneous (e.g. potassium tert.-butylate) or heterogeneous one (e.g. hydrotalcite). Typically, the alkoxylation may be conducted at temperatures from 80° C. to 150° C., preferably 100° C. to 120° C. and pressures from 1 to 5 bar.

If the alkyl- and/or alkenyl oligoglycosides are alkoxylated one may add 1 to 50, preferably 2 to 40 and more preferably 5 to 25 moles alkylene oxide, preferably ethylene oxide and/or propylene oxide, to the glycosides. In a preferred embodiment of the invention at least 20 mole % and particularly at least 50 mole % of the alkylene oxide units are ethylene oxide units. In a further preferred embodiment of the invention, the alkylene oxides used are ethylene oxide and/or propylene oxide wherein at least 20 mole %, preferably at least 50 mole % and more preferably at least 80 mol % of the alkylene oxide units are ethylene oxide units.

Carboxylate Derivatives

The alkyl and/or alkenyl oligoglycoside derivatives used in the method according to the present invention are alkyl and/or alkenyl oligoglycoside (ether) carboxylates according to formula (I)

$$R^1-O-[(G)_p(AO)_n]-R^2-COOX)_q \qquad (I)$$

wherein
$R^1$ is a linear or branched alkyl and/or alkenyl group having from 4 to 22 carbon atoms, in particular 8 to 22, preferably 8 to 18 carbon atoms, and more preferably from 10 to 16 carbon atoms;
$R^2$ is a linking group selected from the group of
  $R^{2a}$: aliphatic hydrocarbon groups, preferably alkylene groups comprising 1 to 6 carbon atoms,
  $R^{2b}$: ester groups of the general formula —C(O)—O—$R^3$— (IV), where in $R^3$ is a saturated or unsaturated aliphatic or aromatic hydrocarbon group comprising 1 to 6 carbon atoms;
X is hydrogen or an alkaline cation, preferably sodium or potassium;
AO is one or more groups selected from the group of ethylene oxide, propylene oxide and/or butylene oxide groups;
G is a sugar unit having 5 or 6 carbon atoms, preferably a glucose unit;
n is a number from 0 to 50;
p is a number from 1 to 10, preferably from 1 to 2; and
q is a number from 1 to 4, preferably from 1 to 2.

The alkyl and/or alkenyl oligoglycoside (ether) carboxylates may be obtained by reacting alkyland/or alkenyl oligoglycosides or alkoxylated alkyl- and/or alkenyl oligoglycosides with suitable reagents for introducing carboxylate groups.

Examples of suitable reagents for introducing carboxylic acid groups comprise
(a) halogene substituted carboxylic acids, such as α-halogen carboxylic acids or α-halogen carboxylic acids, preferably chloroacetic acid or its sodium salt;
(b) alpha, beta-unsaturated carboxylic acids, preferably (meth)acrylic acid; or
(c) cyclic dicarboxylic acid anhydrides, preferably succinic acid anhydride, maleic acid anhydride or phthalic acid anhydride,
as they are for example disclosed in WO 2002/090369 A2 and U.S. Pat. No. 6,248,792 B1.

The nature of the linking group $R^2$ depends on the nature of the reagent used for introducing the carboxcylic acid group.

Alkyl and/or alkenyl oligoglycoside (ether) carboxylates comprising groups —$R^{2a}$—COOX may be obtained by using halogene substituted carboxylic acids (a) comprising 2 to 7 carbon atoms. In case of using chloroacetic acid or its sodium salt $R^{2a}$ is a methylene group $CH_2$—, in case of using ω-chloro propionic acid or its salt, $R^{2a}$ is a 1,2-ethylene group $CH_2$—$CH_2$—, in case of using α-chloro propionic acid or its salt, $R^{2a}$ is a —$CH(CH_3)$— group. Groups $R^{2a}$ may also be obtained by using alpha, beta-unsaturated carboxylic acids (b) as reagents. 1,2-ethylene groups —$CH_2$—$CH_2$— may be obtained by using acrylic acid or its salts, 1,2 propylene groups —$CH_2$—$CH(CH_3)$— may be obtained by using methacrylic acid or its salts. In a preferred embodiment of the invention, $R^{2a}$ is a methylene group —$CH_2$—. It goes without saying that also the carboxylation is a statistical process. Therefore, the number of carboxylic groups q does not necessarily need to be an integer but may be a rational number.

Alkyl and/or alkenyl oligoglycoside (ether) carboxylates comprising groups —$R^{2b}$—COOX may be obtained by using cyclic dicarboxylic acid anhydrides. In course of reacting with the OH-groups of the (alkoxylated) alkyl and/or alkenyl oligoglycoside the anhydride cycle is opened. When succinic acid anhydride is used as reagent (alkoxylated) alkyl and/or alkenyl oligoglycosides are formed which comprise —O—C(O)—$CH_2$—$CH_2$—COOX moieties, i.e. $R^{2b}$ is a —O—C(O)—$CH_2$—$CH_2$— group and consequently $R^3$ is an ethylene group —$CH_2$—$CH_2$—.

In a preferred embodiment of the invention, $R^2$ is selected from groups $R^{2a}$, and even more preferred $R^2$ is a methylene group —$CH_2$—.

In one embodiment of the invention the surfactants used have the formula $R^1$—O-$(G)_p$(—$R^2$—COOX)$_q$ (Ia), preferably $R^1$—O-$(G)_p$(—$CH_2$—COOX)$_q$ (Ib), i.e. there are no alkoxy groups present in the surfactant. $R^1$, p, and q have the meaning as defined above. In formulas (Ia) and (Ib) $R^1$ may preferably be an alkyl and/or alkenyl group having from 8 to 22 carbon atoms, more preferably 8 to 18 carbon atoms, and more preferably from 10 to 16 carbon atoms, G preferably is a glucose unit, p is a number from 1 to 2, and q is a number from 1 to 2. Such surfactants are available commercially, e.g. as Plantapon® LGC (BASF Personal Care & Nutrition GmbH).

In another embodiment the surfactants of the formula (I), preferably surfactants of the formula $R^1$—O—[$(G)_p(AO)_n$](—$CH_2$—COOX)$_q$ (Ic) comprise alkoxy groups, i.e. n is ≥0. It goes without saying for the skilled artisan that alkoxylation is a statistical process and the number of alkoxy groups is an average number. Consequently, n not necessarily needs to be an integer but may also be a positive rationale number >0. In this embodiment, preferably n is a number from 1 to 50, more preferably from 2 to 40 and most preferably 5 to 25. $R^1$ may preferably an alkyl and/or alkenyl group having from 8 to 22 carbon atoms, more preferably 8 to 18 carbon atoms, and more preferably from 10 to 16 carbon atoms, G preferably is a glucose unit, p is a number from 1 to 2, and q is a number from 1 to 2.

Aqueous Compositions

For the method of oil recovery according to the present invention an aqueous composition comprising at least one surfactant of formula (I) is used. Preferably, the aqueous composition comprises at least one surfactant of formula (Ia), more preferably at least one of formula (Ib). Of course also mixtures of two or more surfactants of formula (I) may be used.

The alkyl and/or alkenyl oligoglycoside (ether) carboxylates are used at least in a surfactant-active amount, i.e. in such an amount that the surfactants show a detectable influence on interfacial properties in the formation. In particular, the surfactants of formula (I) may be present in said aqueous compositions at a concentration from 0.01% to 5% by weight, in particular 0.05% to 5% by weight, preferably from 0.1% to 2.5% by weight and more preferably from 0.1% to 1.5% by weight based on the amount of all components of the composition.

Besides water and the alkyl and/or alkenyl oligoglycoside (ether) carboxylates of formula (I) the aqueous compositions may of course comprise further components or additives such as cosolvents, co-surfactants, bases, complexing agents or thickening polymers.

Aqueous Solvent

As solvent, the aqueous composition comprises at least 50% by weight of water, preferably at least 80% by weight, more preferably at least 90% by weight of water, based on the amount of all components of the composition. Besides water, the composition may comprise organic solvents miscible with water. Examples of such solvents comprise alcohols such as for example methanol, ethanol, propanol, 1-butanol, 2-butanol, butylethyleneglycol, butylethylenediglycol, or butylethylenetriglycol. In one embodiment of the invention, the aqueous composition only comprises water as solvent.

The water used for the aqueous composition may be fresh water but also brines may be used, such as sea water and/or formation water or sea water and/or formation water mixed with fresh water.

It is a significant advantage of the alkyl and/or alkenyl oligoglycoside (ether) carboxylates used in the method according to the present invention that despite the fact that the surfactants comprise anionic carboxylic groups they have a high salt tolerance, in particular divalent salts such as $Ca^{2+}$ or $Mg^{2+}$.

The possibility of using brines or mixtures of brines and fresh water as solvent is a significant economic advantage of the method according to the invention. It goes without saying that it is far more efficient for offshore oil production to use sea water instead of freshwater. Furthermore, the possibility to re-inject formation water produced (instead of disposing thereof) also provides an economic advantage, in particular for land-based oil production where the disposal of formation water may be difficult.

In one embodiment of the invention the water present in the aqueous composition comprises salts in an amount of from 1 000 ppm to 350 000 ppm, in particular 20 000 ppm to 350 000 ppm, preferably from 20 000 ppm to 200 000 ppm and for example 100 000 ppm to 250 000 ppm. The amount of divalent ions, in particular alkaline earth metal ions, especially of $Mg^{2+}$ and $Ca^{2+}$ ions, may be from 500 to 53 000 ppm, preferably 1000 to 20 000 ppm.

Co-Surfactants

In one embodiment of the aqueous composition comprises at least one additional co-surfactant, for example a surfactant selected from the group of anionic, non-ionic, amphoteric or zwitterionic surfactants or their mixtures, preferably selected from the group of anionic and/or non-ionic surfactants.

In a preferred embodiment of the invention, the aqueous composition comprises at least one anionic surfactant as co-surfactant. Examples of suitable anionic co-surfactants comprise surfactants comprising sulfate, sulfonate or carboxylic groups.

Examples of preferred anionic co-surfactants of the sulfonate type comprise alkylbenzene sulfonates, for example dodeylbenzene sulfonate, petroleum sulfonates, paraffin sulfonates and olefin sulfonates.

Olefin sulfonates are known in the art and usually are mixtures of alkene- and hydroxyalkane sulfonates, and disulfonates, as are obtained, for example, by the sulfonation of monoolefins, for examples C12-30 monoolefines having a terminal or internal double bond with sulfur trioxide and subsequent alkaline or acidic hydrolysis of the sulfonation products.

Further examples of preferred anionic co-surfactants furthermore comprise alkylethersulfates, alkylethersulfonates and alkylethercarboxylates. These co-surfactants may be represented by the general formula RO-$(AO)_k$—R'—Y, wherein R is a linear or branched C12-36 alkyl group, preferably a $C_{16-36}$ alkyl group, AO represents an alkylenoxide group, preferably selected from the group of ethylene oxide, propylene oxide, and butylene oxide groups, k is a number from 1 to 50, preferably from 5 to 30, R' represents a single bond or a linking group, in particular a divalent hydrocarbon linking group comprising 1 to 6 carbon atoms, for example a methylene group and Y represents a group selected from sulfate groups —$OSO_3H$, sulfonate groups —$SO_3H$ and carboxylic groups —COOH or salts thereof, in particular sodium salts. Preferably at least 30 mol %, more preferably at least 50 mole % of the AO groups are ethylene oxide groups.

Examples of non-ionic co-surfactants comprise alkoxylated alcohols, preferably ethoxylated and/or propoxylated, particularly primary alcohols having preferably 12 to 36 carbon atoms and an average of 1 to 12 mol ethylene oxide (EO) and/or 1 to 10 mol propylene oxide (PO) per mol alcohol. $C_8$-$C_{16}$-Alcohol alkoxylates, advantageously ethoxylated and/or propoxylated $C_{10}$-$C_{15}$-alcohol alkoxylates, particularly $C_{12}$-$C_{14}$ alcohol alkoxylates, with an ethoxylation degree between 2 and 10, preferably between 3 and 8, and/or a propoxylation degree between 1 and 6, preferably between 1.5 and 5, are particularly preferred. The cited degrees of ethoxylation and propoxylation are average values that need not necessarily be an integer but may also be rational numbers. Preferred alcohol ethoxylates and propoxylates have a narrowed homolog distribution (narrow range ethoxylates/propoxylates, NRE/NRP). Further examples of non-ionic surfactants comprise fatty alcohols with more than 12 EO. Examples of these are (tallow) fatty alcohols with 14 EO, 16 EO, 20 EO, 25 EO, 30 EO or 40 EO.

Another class of non-ionic surfactants which may be used either as the sole non-ionic surfactant or in combination with other non-ionic surfactants, in particular, together with alkoxylated fatty alcohols and/or alkyl glycosides, are alkoxylated, preferably ethoxylated or ethoxylated and propoxylated fatty acid alkyl esters preferably containing 1 to 4 carbon atoms in the alkyl chain, more particularly the fatty acid methyl esters which are described, for example, in Japanese Patent Application JP-A-58/217598 or which are preferably produced by the process described in WO 90/13533 A1. Methyl esters of $C_{12}$-$C_{18}$ fatty acids containing an average of 3 to 15 EO, particularly containing an average of 5 to 12 EO, are particularly preferred.

Of course, the derivatives according to the present invention can also combined with non modified alkyl oligoglucosides. Suitable types have already been disclosed before.

Non-ionic surfactants of the amine oxide type, for example, N-coco alkyl-N,N-dimethylamine oxide and N-tallow alkyl-N,N-dihydroxyethylamine oxide, and the fatty acid alkanolamides may also be suitable.

Also, so-called gemini surfactants may be used as co-surfactants. Gemini surfactants comprise two hydrophilic groups and two hydrophobic groups per molecule. As a rule, these groups are separated from one another by a "spacer". The spacer is usually a hydrocarbon chain that is intended to be long enough such that the hydrophilic groups are a sufficient distance apart to be able to act independently of one another. These types of surfactants are generally characterised by an unusually low critical micelle concentration and the ability to strongly reduce the surface tension of water. In exceptional cases, however, not only dimeric but also trimeric surfactants are meant by the term gemini surfactants.

Furthermore, amphoteric or zwitterionic co-surfactants may be used as co-surfactant, for example betaines. Amphoteric or ampholytic surfactants possess a plurality of functional groups that can ionize in aqueous solution and thereby—depending on the conditions of the medium—exhibit anionic or cationic character to the compounds (see DIN 53900, July 1972). Close to the isoelectric point (around pH 4), the amphoteric surfactants form inner salts, thus becoming poorly soluble or insoluble in water. Amphoteric surfactants are subdivided into ampholytes and betaines, the latter existing as zwitterions in solution. Ampholytes are amphoteric electrolytes, i.e. compounds that possess both acidic as well as basic hydrophilic groups and therefore behave as acids or as bases depending on the conditions. Especially betaines are known surfactants which are mainly produced by carboxyalkylation, preferably carboxymethylation, of amine compounds. The starting materials are preferably condensed with halocarboxylic acids or salts thereof, more particularly sodium chloroacetate, one mole of salt being formed per mole of betaine. The addition of unsaturated carboxylic acids, such as acrylic acid for example, is also possible. Examples of suitable betaines are the carboxyalkylation products of secondary and, in particular, tertiary amines which correspond to formula $R^1R^2R^3N$—$(CH_2)_q$COOX where $R^1$ is a an alkyl radical having 6 to 22 carbon atoms, $R^2$ is hydrogen or an alkyl group containing 1 to 4 carbon atoms, $R^3$ is an alkyl group containing 1 to 4 carbon atoms, q is a number of 1 to 6 and X is an alkali and/or alkaline earth metal or ammonium. Typical examples are the carboxymethylation products of hexylmethylamine, hexyldimethylamine, octyldimethylamine, decyldimethylamine, $C_{12/14}$-cocoalkyldimethylamine, myristyldimethylamine, cetyldimethylamine, stearyldimethylamine, stearylethylmethylamine, oleyldimethylamine, $C_{16/18}$-tallowalkyldimethylamine and their technical mixtures, and particularly dodecyl methylamine, dodecyl dimethylamine, dodecyl ethylmethylamine and technical mixtures thereof. Such surfactants are commercially available, for instance as Dehyton® AB.

Other suitable betaines are the carboxyalkylation products of amidoamines corresponding to formula RICO—NH—$(CH_2)_p$—$N(R^3)(R^4)$—$(CH_2)_q$COOX in which RICO is an aliphatic acyl radical having 6 to 22 carbon atoms and 0 or 1 to 3 double bonds, $R^2$ is hydrogen or an alkyl radical having 1 to 4 carbon atoms, $R^3$ is an alkyl radical having 1 to 4 carbon atoms, p is a number from 1 to 6, q is a number from 1 to 3 and X is an alkali and/or alkaline earth metal or ammonium. Typical examples are reaction products of fatty acids having 6 to 22 carbon atoms, like for example α-proic acid, caprylic acid, caprinic acid, lauric acid, myristic acid, palmitic acid, palmoleic acid, stearic acid, isostearic acid, oleic acid, elaidic acid, petroselinic acid, linolic acid linoleic acid, elaeostearic acid, arachidonic acid, gadoleic acid, behenic acid, erucic acid and their technical mixtures with N,N-dimethylaminoethylamine, N,N-dimethylaminopropylamine, N,N-diethylaminoethylamine and N,N-diethylaminopropylamine, which are condensed with sodium chloroacetate. Such products are also commercially avalable, for instance as Dehyton® K, Dehyton® PK or as Tego®Betaine.

Other suitable starting materials for betaines to be used for the purposes of the invention are imidazolines. These substances are also known and may be obtained, for example, by cyclizing condensation of 1 or 2 moles of $C_6$-$C_{22}$ fatty acids with polyfunctional amines, such as for example aminoethyl ethanolamine (AEEA) or diethylenetriamine. The corresponding carboxyalkylation products are mixtures of different open-chain betaines. Typical examples are condensation products of the above-mentioned fatty acids with AEEA, preferably imidazolines based on lauric acid, which are subsequently betainised with sodium chloroacetate. Commercially available products include Dehyton® G.

The co-surfactants may be present in amounts of 0.01 to 5.0, preferably about 0.05 to about 1.5% by weight based on the total amount of all components of the aqueous composition.

The alkyl and/or alkenyl oligoglycoside (ether) carboxylates of formula (I) and the co-surfactants may be present in the aqueous composition in ratio by weight of about 10:90 to about 90:10, preferably about 25:75 to about 75:25 and more preferably about 40:60 to about 60:40. The total concentration of all surfactants together is generally 0.01 to 5% by weight based on the total amount of the aqueous surfactant composition, preferably 0.05 to 2.5% by weight and more preferably 0.1 to 2% by weight.

Bases

In a particularly preferred embodiment of the invention, the aqueous composition additionally comprises at least one base. Such bases may be selected from the group of the alkali metal hydroxides, alkali metal silicates or alkali metal carbonates, preferably from alkali metal hydroxides and alkali metal carbonates.

Aqueous composition comprising bases may be used for the so called alkali-surfactant flooding and/or alkali-surfactant-polymer flooding. With such addition of bases, for example, retention in the formation can be reduced. Advantageously, the addition of basic salts converts acidic compounds in the mineral oils, especially naphthenic acids which occur in the mineral oil, to the corresponding salts, which gives rise to a natural surfactant action. The lowering of the interfacial tension is thus caused not only by the alkyl and/or alkenyl oligoglycoside (ether) carboxylates and optionally co-surfactants alone, but is promoted by natural surfactants.

The amount of base may typically be from 0.1% by weight to 5% by weight based on the total amount of all components of the aqueous composition. Examples of preferred basic salts comprise sodium carbonate or sodium hydroxide. The pH value of such aqueous compositions comprising bases may be adjusted by the skilled artisan according to his/her needs and may be from more than 7 to 13, preferably from 8 to 12, more preferably from 9 to 11.

Thickening Polymers

The aqueous composition may in addition comprise one or more water soluble thickening polymer. Thickening polymers for use in oilfield applications are known to the skilled artisan.

Examples of such thickening polymers include homo- and copolymers of acryl amide such as homo-polyacrylamide, partially hydrolyzed polyacrylamides or copolymers of acrylamide and monomers comprising acids groups, e.g. sulfonate groups and/or carboxylate groups.

A class of thickeners that is particularly useful includes homopolysaccharide gum thickeners. Such thickeners are typically non-ionic and have a molecular weight that is greater than about one million, preferably in the range of about 1 to about 3.5 million. The polymer structure is preferably a linear chain of hydroglucose units linked beta (1-3). The homopolysaccharide gum thickeners have a number of significant advantages over many of the conventional water flooding thickeners. First, these thickeners are generally more thermally stable. That is, they undergo only a moderate decrease in viscosity when temperatures increases while most natural and synthetic gums undergo a marked decrease in viscosity with increase in temperature. With these thickeners, the changes in viscosity at low concentrations are relatively small. Second, these thickeners are relatively easy to inject. Close to the injection well, flooding fluids have to flow at relatively fast rates. These thickeners maintain their viscosities almost unchanged after strong mechanical shearing. Third, these thickeners have a relatively high salt tolerance, particularly with respect to divalent and trivalent metal ions. Fourth, the viscosities of the surfactant slugs and buffer slugs comprising such thickeners are relatively unaffected by pH variations in the range of about 3 to about 11.

Further Components

Examples of further components which may be added to the aqueous composition comprise in particular complexing agents, for example EDTA or MGDA. Such complexing agents may advantageously be used, when the aqueous formulation comprises bases.

Preferred Aqueous Compositions

Preferred aqueous compositions comprise water having a salinity of from 1,000 to 350,000 ppm, preferably from 1,000 ppm to 200,000 ppm and the contents of the surfactants according to formula (I) is from 0.05% by weight to 0.5% by weight. Preferably, the surfactants are surfactants of formula (Ia). Furthermore, at least a co-surfactant and/or complexing agent may be present.

Preferred aqueous compositions for alkali-surfactant flooding comprise water having a salinity of from 1,000 to 350,000 ppm, preferably from 1,000 ppm to 200,000 ppm and the contents of the surfactants according to formula (I) is from 0.05% by weight to 0.5% by weight. Preferably, the surfactants are surfactants of formula (Ia). Furthermore, the aqueous composition comprises a base, preferably NaOH and/or $Na_2CO_3$, to adjust the pH value to 8 to 12, preferably 9 to 11. Furthermore, a co-surfactant and/or complexing agents may be present.

Preferred aqueous compositions for alkali-surfactant-polymer flooding comprise water having a salinity of from 1,000 to 350,000 ppm, preferably from 1,000 ppm to 200,000 ppm and the contents of the surfactants according to formula (I) is from 0.05% by weight to 0.5% by weight. Preferably, the surfactants are surfactants of formula (Ia). Furthermore, the aqueous composition comprises a base, preferably NaOH and/or $Na_2CO_3$, to adjust the pH value to 8 to 12, preferably 9 to 11 and a thickening polymer, preferably at an amount of from 0.05% b weight to 0.5% by weight. Furthermore, a co-surfactant and/or complexing agents may be present.

Manufacture of the Aqueous Compositions

The aqueous composition to be used may be manufactured by mixing all components with water and/or brine using usual mixing agents. This may be done on site. It is of course possible first to produce a concentrate, for examples in a chemical plant, which is only diluted to the desired concentration for injection into the formation once on site. In general, the total concentration of the surfactants in such a concentrate may be from 30 to 50% by weight.

Method of Recovering Oil from a Subterranean Formation

The method according to the present invention may be employed to subterranean formations having a formation temperature of at least 10° C., for example 10 to 150° C., especially a formation temperature of at least 15° C. to 120° C. The method is especially suitable for deposits with elevated deposit temperature, especially deposits at 40° C. to 120° C., preferably 45° C. to 110° C. and more preferably 50° C. to 100° C.

The oil may comprise light, medium or heavy oils, for example those with an API gravity of 10° to 45° API (as defined by the American Petroleum Institute).

In a known manner, the subterranean formation comprises oil and formation water, which generally has a greater or lesser salt content. The salts in the formation water may especially be alkali metal salts and alkaline earth metal salts. Examples of typical cations comprise $Na^+$, $K^+$, $Mg^{2+}$ or $Ca^{2+}$, and examples of typical anions comprise chloride, bromide, hydrogencarbonate, sulfate or borate.

The total salinity (TDS) of the formation water may range up to 200,000 ppm or even higher numbers and concentrations of divalent metal ions may be up to 20,000 ppm or even higher. Advantageously, the surfactants according to the present invention are suitable for deposits comprising formation water having a total salinity of more than 30 000 ppm. Such conditions are typically encountered under various circumstances at Prudhoe Bay, the North Sea, the Persian Gulf, the Gulf of Mexico, as well as other major oil fields. In one embodiment of the invention, the total salt content of the deposit water is from 20 000 ppm to 350 000 ppm (parts by weight based on the sum of all components of the deposit water), for example 100 000 ppm to 250 000 ppm. The amount of alkaline earth metal ions, especially of $Mg^{2+}$ and $Ca^{2+}$ ions, may be 1000 to 53 000 ppm.

In the method according to the invention, the aqueous surfactant composition described above is injected into the mineral oil deposit through at least one injection borehole and crude oil is withdrawn from the deposit through at least one production borehole. In this context, the term "crude oil" of course does not mean single-phase oil, but means the customary crude oil-water emulsions. In general, a deposit is provided with several injection boreholes and with several production boreholes. One well arrangement commonly used in water flooding operations and suitable for use in carrying out the method of the present invention is an integrated five-spot pattern of the type illustrated in U.S. Pat. No. 3,927,716. Other well arrangements known in the art may also be used in carrying out the present invention.

The composition of the aqueous composition used for the present invention may be selected by the skilled artisan according to his/her needs and the conditions prevailing in the subterranean formation. Suitable aqueous compositions and preferred embodiments have already been described above.

In one embodiment of the invention the method is an alkali-surfactant flooding process. In this embodiment an aqueous composition comprising at least—besides water and the surfactants according to formula (I)—one base is used. Suitable aqueous compositions alkali-surfactant flooding and preferred embodiments have already been described above.

In another embodiment of the invention the method according to the present invention is an alkali-surfactant-polymer flooding process In this embodiment an aqueous composition comprising at least—besides water and the surfactants according to formula (I) one base and one thickening polymer is used. Suitable aqueous compositions alkali-surfactant-polymer flooding and preferred embodiments have already been described above.

The method according to the present invention may of course comprise further steps.

The aqueous composition that is injected into the subterranean formation according to the method of the present invention can also be referred to as a surfactant slug.

In one embodiment, a surfactant slug is injected into the formation through one or more injection wells followed by a buffer slug. After the buffer slug an aqueous flooding medium may optionally be injected to drive the oil toward one or more production wells. The surfactant slug typically has a lower viscosity than the buffer slug. The surfactant slug can contain a thickener; the concentration of the thickener preferably being in the range of about 0.05% to about 0.2% by weight. The buffer slug contains an effective amount of a thickener to increase the viscosity of the buffer slug to a level above that of the surfactant slug, and thereby decrease the mobility ratio between the injected water and the oil in the formation.

The size of the surfactant slug ranges from about 0.2 to about 3 pore volumes. The concentration of the surfactant or surfactant mixture in the surfactant slug is preferably adjusted in accordance with the size of the slug. Thus, a surfactant slug with a pore volume of about 0.2 preferably has a combined surfactant concentration of about 1 to about 3% by weight. A surfactant slug with a pore volume of about 1 preferably has a surfactant concentration of about 0.1 to about 2% by weight. A surfactant slug with a pore volume of about 2 preferably has a surfactant concentration of about 0.1 to about 1.0% by weight.

The buffer slug can employ any thickening agent that is stable under the anticipated operating conditions. The thickening agent is employed at an effective level to increase the viscosity of the buffer slug to a value in excess of the viscosity of the surfactant slug to provide an enhanced mobility ratio between the buffer slug and the surfactant slug and thereby increase the macroscopic displacement efficiency of the water-flood.

The buffer slug employed in accordance with the invention preferably has a thickener concentration of about 0.05% to about 0.2% by weight, more preferably about 0.05 to about 0.1% by weight. Preferably, the concentration of thickener in the buffer slug is at least about 0.02% by weight higher than the concentration of thickener in the surfactant slug. The higher concentration of thickener in the buffer slug in relation to concentration of thickener, if any, in the surfactant slug is essential to the effective operation of the method of the present invention to insure proper control of the relative mobilities of the surfactant slug and the buffer slug. The buffer slug preferably has a pore volume in the range of about 0.6 to about 3.

The drive fluid or aqueous flooding medium is injected into the reservoir in sequential order after the surfactant slug and buffer slug. This flooding medium is preferably water and can be any source of water, such as sea water, that is readily available.

The examples which follow are intended to illustrate the invention in detail:

EXAMPLE 1

Comparative Examples C1 to C3

Interfacial tension (IFT) of aqueous surfactants solutions of a concentration of 0.2% by weight was determined against decane and crude oil by spinning drop measurements (spinning time of 30 min, given values are average values). The brine phase contained 200,000 ppm salt by weight (NaCl, $CaCl_2$, $MgCl_2$). Measurements were performed at 50° C. The results are compiled in the following Table 1. Example 1 is according to the invention (a $C_{12}$-$C_{14}$ alkyl oligoglucoside modified with one $CH_2$—COONa group, DP=1.15), and examples C1 to C3 using alkylpolyglycosides which have not been modified serve for comparison.

TABLE 1

IFT of alkyl oligoglucosides and their derivatives (DP = 1.15)

| Ex. | Surfactants | IFT measured with decane [$mNm^{-1}$] | IFT measured with crude oil [$mNm^{-1}$] |
|---|---|---|---|
| C1 | $C_8$-$C_{10}$ Alkyl oligoglucoside | 1.182 ± 0.064 | 0.386 ± 0.010 |
| C2 | $C_9$-$C_{11}$ Alkyl oligoglucoside | 0.850 ± 0.028 | 0.614 ± 0.066 |
| C3 | $C_{12}$-$C_{14}$ Alkyl oligoglucoside | 0.440 ± 0.068 | <0.01 |
| 1 | $C_{12}$-$C_{14}$ Alkyl oligoglucoside carboxylate | 0.631 ± 0.055 | <0.05 |

The examples indicate that alkyl oligoglucosides and alkyl oligoglucoside derivatives show similar interfacial tensions when decane is used as the oil phase. In crude oil $C_{12}$-$C_{14}$ alkyl oligoglucosides as well as $C_{12}$-$C_{14}$ alkyl oligoglucoside carboxylates show significantly lower IFT than $C_8$-$C_{10}$ and $C_9$-$C_{11}$ alkyl oligoglucosides.

EXAMPLE 2

Comparative Examples C4 and C5—Alkali-Surfactant-Flooding

Interfacial tension (IFT) of surfactant solutions of a concentration of 0.1% by weight in saline water was determined against a dead crude oil (i.e. degassed crude oil) of 24° API at 40° C. by spinning drop measurements. IFT was notified after 1 to 30 minutes. The saline water contained sodium chloride. In addition sodium carbonate was used as a base.

Solubility of surfactant in saline water at 40° C. was determined and is reflected in Table 2. Example 2 is according to the invention (a $C_{12}$-$C_{14}$ alkyl oligoglucoside modified with one —$CH_2$—COONa group, DP=1.15), Examples C4 and C5 serve for comparison.

TABLE 2

IFT of alkyl oligoglucosides and their derivatives (DP = 1.15)

| Ex. | Surfactants | NaCl [% b.w.] | Na$_2$CO$_3$ [% b.w.] | Solubility | IFT [mNm$^{-1}$] |
|---|---|---|---|---|---|
| C4 | C$_{10}$-C$_{16}$ Alkyl oligoglucoside | 1.0 | 0.1 | Very turbid after shaking | 0.0608 |
| C5 | C$_8$-C$_{14}$ Alkyl oligoglucoside | 1.0 | 0.1 | Clear | 0.0144 |
| 2 | C$_{10}$-C$_{16}$ Alkyl oligoglucoside carboxylate | 1.0 | 0.1 | Clear | 0.0052 |

Comparison Example C4 shows that the alkyl oligoglucoside based on an alkyl moiety with 10 to 16 carbon atoms is difficult to solubilize under the test conditions.

An IFT of 0.0608 nNm$^{-1}$ is not sufficient, since it means that the product after injection into the reservoir would lead to phase separation, resulting in either a loss of surfactant or a blockage of the porous formation.

The alkyl oligoglucoside of Comparison Example C5 has a clear aspect, but the IFT is still too high to provide acceptable results when injected into the formation.

Only the example 2 according to the invention provides an ultra-low IFT that is suitable to provide the necessary performance.

The invention claimed is:

1. A method of recovering oil from a subterranean formation comprising the step of injecting into said formation an aqueous composition that contains a surface-active amount of an alkyl or alkenyl oligoglycoside (ether) carboxylate according to formula (I)

$$R^1—O—[(G)_p(AO)_n](—R^2—COOX)_q \quad (I)$$

wherein
- $R^1$ is a linear or branched alkyl and/or alkenyl group having from 8 to 22 carbon atoms;
- $R^2$ is a linking group selected from the group of
  - $R^{2a}$: hydrocarbon groups comprising 1 to 6 carbon atoms,
  - $R^{2b}$: ester groups —C(O)—O—$R^3$—, wherein $R^3$ is a hydrocarbon group comprising 1 to 6 carbon atoms;
- X is hydrogen or an alkaline cation;
- AO is one or more groups selected from the group of ethylene oxide, propylene oxide and/or butylene oxide groups;
- G is a sugar unit having 5 or 6 carbon atoms;
- n is a number from 0 to 50;
- p is a number from 1 to 10; and
- q is a number from 1 to 4;
- wherein the aqueous composition is injected into the subterranean formation through at least one injection borehole and crude oil is withdrawn from the subterranean formation through at least one production borehole;
- wherein said aqueous composition additionally comprises a base and has a pH from to 13.

2. The method according to claim 1, wherein said alkyl or alkenyl oligoglycoside (ether) carboxylates are present in said aqueous compositions at a concentration in the range of 0.05% to about 5% by weight based on the total amount of the aqueous surfactant formulation.

3. The method according to claim 1, wherein
- $R^1$ is a linear alkyl and/or alkenyl group having from 10 to 16 carbon atoms;
- $R^2$ is a group $R^{2a}$;
- G is a glucose unit;
- n is a number from 0 to 50;
- p is a number from 1 to 2; and
- q is 1 to 2.

4. The method according to claim 1, wherein the alkyl or alkenyl oligoglycoside carboxylate has the general formula $R^1—O-(G)_p(—CH_2—COOX)_q$ (Ib) and $R^1$, G, p, q, and X have the meaning as defined in claim 1.

5. The method according to claim 4, wherein G is a glucose unit, p is a number from 1 to 2, and q is a number from 1 to 2.

6. The method according to claim 1, wherein the water in said aqueous composition comprises salts.

7. The method according to claim 6, wherein the concentration of the salts is from 1,000 ppm to 350,000 ppm.

8. The method according to claim 6, wherein said aqueous composition comprises divalent metal ions.

9. The method according to claim 8, wherein the divalent metal ions are selected from the group of Ca$^{2+}$ and Mg$^{2+}$.

10. The method according to claim 8, wherein the amount of divalent metal ions is from 500 ppm to 53,000 ppm.

11. The method according to claim 1, wherein the water in said aqueous composition comprises sea water.

12. The method according to claim 1, wherein said aqueous composition has a salinity of from 1,000 ppm to 350.00 ppm, the contents of surfactants according to formula (I) is from 0.05% by weight to 0.5% by weight and the pH-value of the composition is from 8 to 12.

13. The method according to claim 12, wherein the composition additionally comprises a water-soluble, thickening polymer at an amount of from 0.05% to 0.5% by weight.

14. The method according to claim 1, wherein the aqueous composition additionally comprises at least one complexing agent.

15. The method according to claim 1, wherein the temperature of the subterranean formation is from 15° C. to 120° C.

16. The method according to claim 1, wherein said aqueous composition also comprises surface-active amounts of co-surfactants selected from the group of anionic, nonionic, amphoteric or zwitterionic surfactants and their mixtures.

17. The method according to claim 16, wherein the co-surfactants comprise at least one anionic co-surfactant.

18. The method according to claim 17, wherein the anionic co-surfactant is an organic sulfonate selected from the group of alkylbenzene sulfonates, petroleum sulfonates, paraffin sulfonates and olefin sulfonates.

19. The method according to claim 17, wherein the anionic co-surfactant is selected from the group of alkylethersulfates, alkylethersulfonates and alkylethercarboxylates.

20. The method according to claim 16, wherein said co-surfactants are present in said aqueous compositions at a concentration in the range of about 0.01% to about 5% by weight.

21. The method according to claim 16, wherein said alkyl or alkenyl oligoglycosides and said co-surfactants are present in said aqueous compositions in a ratio by weight of about 10:90 to about 90:10.

* * * * *